(12) United States Patent
Kim

(10) Patent No.: US 7,812,923 B2
(45) Date of Patent: Oct. 12, 2010

(54) LIQUID CRYSTAL DISPLAY DEVICE AND METHOD FOR DRIVING THE SAME WITH PARTICULAR LIGHT FOCUSING UNIT

(75) Inventor: KiDuk Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1020 days.

(21) Appl. No.: 11/588,342

(22) Filed: Oct. 27, 2006

(65) Prior Publication Data

US 2007/0097287 A1    May 3, 2007

(30) Foreign Application Priority Data

Oct. 28, 2005    (KR) ...................... 10-2005-0102072

(51) Int. Cl.
*G02F 1/13*    (2006.01)
*G02F 1/1335*    (2006.01)

(52) U.S. Cl. ............................ 349/200; 349/61; 349/62

(58) Field of Classification Search ................. 349/200, 349/61, 62
See application file for complete search history.

(56) References Cited

U.S. PATENT DOCUMENTS

| 6,778,246 B2 * | 8/2004 | Sun et al. ..................... 349/146 |
| 2007/0139333 A1 * | 6/2007 | Sato et al. ..................... 345/90 |
| 2007/0229754 A1 * | 10/2007 | Galstian et al. ............. 349/200 |

\* cited by examiner

*Primary Examiner*—Mike Qi
(74) *Attorney, Agent, or Firm*—Morgan Lewis & Bockius LLP

(57) ABSTRACT

A liquid crystal display device includes a liquid crystal panel; a backlight unit supplying light onto the liquid crystal panel; and a light focusing unit between the backlight unit and the liquid crystal panel, the light focusing unit for focusing the light supplied from the backlight unit into a first region of the liquid crystal panel by increasing a phase delay of the light supplied from the backlight unit within a portion of the light focusing unit.

18 Claims, 5 Drawing Sheets

LIQUID CRYSTAL DISPLAY DEVICE AND METHOD FOR DRIVING THE SAME WITH PARTICULAR LIGHT FOCUSING UNIT

This application claims the benefit of Korean Patent Application No. 10-2005-0102072, filed on Oct. 28, 2005, which is hereby incorporated by reference in its entirety.

BACKGROUND OF THE INVENTION

1. Field of the Invention

Embodiments of the present invention relates to a liquid crystal display (LCD) device, and more particularly, to an LCD device capable of increasing the light efficiency of a backlight unit and a method for driving the same. Embodiments of the present invention are suitable for a wide scope of applications. In particular, an embodiment of the present invention is suitable for increasing the light efficiency of a backlight unit of an LCD.

2. Description of the Related Art

In general, a liquid crystal display (LCD) device, which is one example of a flat panel display, is being widely used in various applications because it consumes relatively less power and is lighter and thinner, compared to other display devices. Moreover, the LCD device may be manufactured in more various sizes of products the other display devices.

The LCD device relies on an optical anisotropy and a polarizability of liquid crystal molecules to produce an image. The optical anisotropy of liquid crystal molecules causes a refraction of light incident onto the liquid crystal molecules in accordance with an alignment direction of the liquid crystal molecules. The LCD device controls the amount of light incident onto the liquid crystal molecules. A backlight may be provided to project the light incident onto the liquid crystal panel.

FIG. 1 is a schematic side view of a related art LCD device. Referring to FIG. 1, the Related Art LCD device includes a liquid crystal panel 10 and a backlight unit 20 facing a surface of the liquid crystal panel 10. Not shown in FIG. 1, the liquid crystal panel 10 may include an array substrate and a color filter substrate. The array substrate includes a thin film transistor and a pixel electrode. The color filter substrate includes a color filter layer, a black matrix layer, and a common electrode. The array substrate and the color filter substrate face each other at a predetermined distance from each other. A liquid crystal layer is interposed between the array substrate and the color filter substrate. A voltage applied to the pixel electrode and the common electrode generates an electric field between the two substrates. Then, light from the backlight unit 20 is projected onto the liquid crystal display panel 10 to display an image.

The backlight unit 20 includes a light source unit 22 and a light scattering unit 24 disposed on the light source unit 22. The light source unit 22 generates light and may be formed of a cold cathode florescent lamp. The light scattering unit 24 provides the liquid crystal panel 10 with a light source having a uniform brightness distribution, and prevents the external appearance of the light source unit 22, such as the shape and geometric contours of the light source unit 22, from being displayed on a display surface.

Thus, the backlight unit 20 generates light from the light source 22. The generated light is scattered through the light scattering unit 24 to have a uniform brightness, and the scattered light is incident into the liquid crystal panel 10. The brightness of the light incident into the liquid crystal panel 10 is determined by the brightness of the backlight unit 20. In a system having a 5% transmissivity, the backlight unit 20 should generate brightness of about 200 nt to achieve a total brightness of up to about 100 nt. When a high brightness needs to be achieved in a particular area of the display, the total brightness of the backlight needs to be increased.

Thus, the related art backlight unit 20 consumes high power because a high voltage is applied to the light source unit 22 to increase the brightness. Moreover, the high power consumption causes an increase of the total temperature in the LCD device. Accordingly, causing defects of the components constituting the LCD device, or deteriorating the durability of the LCD device.

SUMMARY OF THE INVENTION

Accordingly, embodiments of the present invention are directed to a liquid crystal display device and a method for driving the same that substantially obviate one or more of the problems due to limitations and disadvantages of the related art.

An object of the present invention is to provide an LCD device capable of producing a high brightness in a predetermined region of a liquid crystal panel without an increase in a power consumption increase.

Another object of the present invention is to provide a method for driving an LCD device to produce a high brightness in a predetermined region of a liquid crystal panel without an increase in a power consumption increase.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these objects and other advantages and in accordance with the purpose of the invention, as embodied and broadly described herein, a liquid crystal display device includes a liquid crystal panel; a backlight unit supplying light onto the liquid crystal panel; and a light focusing unit between the backlight unit and the liquid crystal panel, the light focusing unit for focusing the light supplied from the backlight unit into a first region of the liquid crystal panel by increasing a phase delay of the light supplied from the backlight unit within a portion of the light focusing unit.

In another aspect, a liquid crystal display device includes a liquid crystal panel for displaying an image; a backlight unit projecting light onto the liquid crystal panel; a timing controller controlling the backlight unit; and a light focusing unit between the backlight unit and the liquid crystal panel, the light focusing unit for focusing the light supplied from the backlight unit into a first region of the liquid crystal panel in accordance with a brightness of an image signal from the timing controller by increasing a phase delay of the light supplied from the backlight unit within a portion of the light focusing unit.

In another aspect, a method is provided for driving a liquid crystal display device including a liquid crystal panel, a backlight unit supplying light onto the liquid crystal panel, and a light focusing unit disposed between the backlight unit and the liquid crystal panel; the method includes inputting an image to be displayed on the liquid crystal panel; determining a first region in the input image requiring a high brightness; and focusing the light supplied from the backlight unit into the first region in accordance with the high brightness required within the first region by increasing a phase delay of the light supplied from the backlight unit through a portion of the light focusing unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of embodiments of the present invention and are incorporated in and constitute a part of this application, illustrate embodiments of the present invention and together with the description serve to explain the principle of embodiments of the present invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
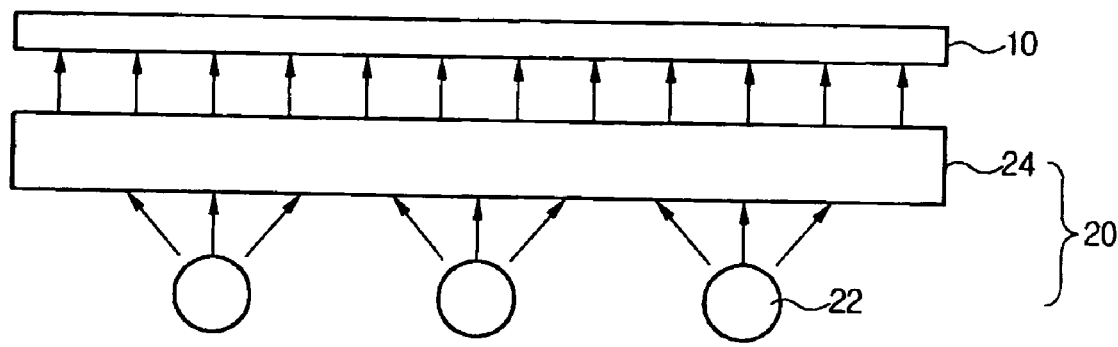
FIG. 1 is a schematic side view of a related art LCD device.
Figure 2:
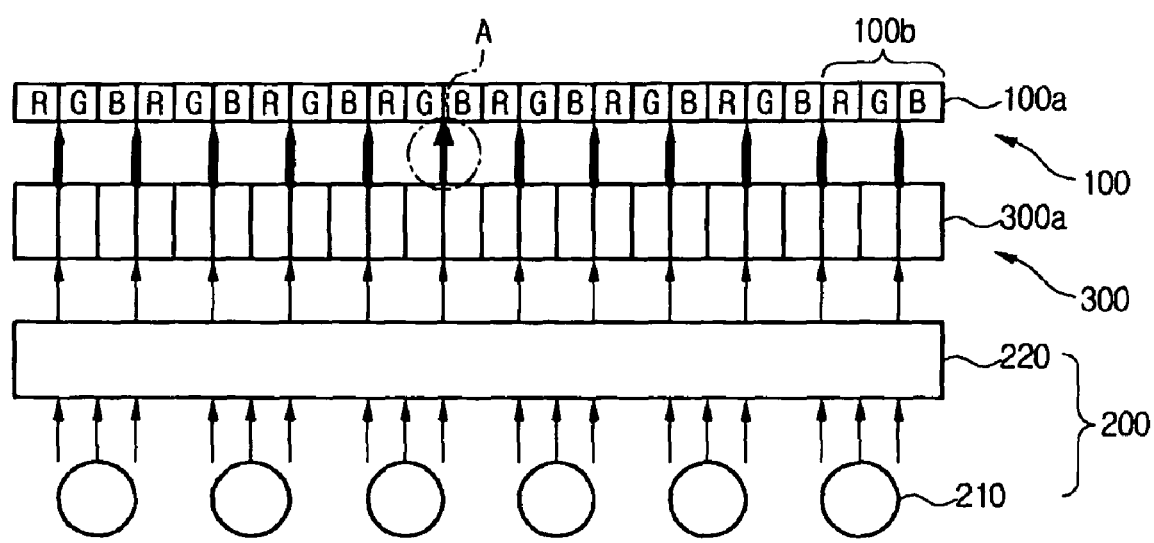
FIG. 2 is a schematic side view of an LCD device according to an embodiment of the present invention.

FIG. 2 is a schematic side view of an LCD device according to an embodiment of the present invention. Referring to FIG. 2, an LCD device includes a liquid crystal panel 100 for displaying an image, a backlight unit 200 facing a surface of the liquid crystal panel 100, and a focusing unit 300 disposed between the liquid crystal panel 100 and the backlight unit 200.

The liquid crystal panel 100 may include two substrates having respective electrodes spaced apart from each other by a predetermined distance. A liquid crystal material is interposed between the two substrates. The liquid crystal panel 100 also includes a plurality of gate lines and data lines crossing each other. A thin film transistor is provided a each crossing of one of the gate lines with one of the data lines. The thin film transistor is turned ON by a signal applied through the gate line, and drives the liquid crystal by supplying a data voltage from the data line to one of the electrodes.

The backlight unit 200 includes a light source unit 210, and a light scattering unit 220 disposed on the light source unit 210. The light source unit 210 generates light and may be formed of a cold cathode florescent lamp. The light source units 210 may be arranged along a line to face a surface of the liquid crystal panel 100. Thus, the backlight unit 200 may be a direct type providing a high brightness in a large-sized panel.

The light scattering unit 220 scatters light generated from the light source unit 210 to allow the light to be uniformly incident into the liquid crystal panel 100. A plurality of diffusion sheets or diffusion plates (not shown) may be disposed between the light source unit 210 and the light scattering unit 220 to increase the light scattering effect.

The light focusing unit 300 focuses light into a predetermined region of the liquid crystal panel 100 in response to an external signal. For example, a brightness signal in an image signal inputted into the LCD device is analyzed to identify a region A that requires a high brightness. Then, light is focused into the region A. Therefore, the total brightness increases by focusing light into the region A without applying a high voltage to the backlight unit 200.

Thus, light efficiency increases because the light generated by the backlight unit 200 is focused into a display region A, rather than dispersed or scattered to be incident into a non-display region. In an embodiment of the present invention, a voltage substantially equal to the related voltage may be applied to the backlight unit 200 to achieve a higher total brightness of the light projected onto the liquid crystal panel 100 when using the focusing unit 300.

In an embodiment of the present invention, as shown in FIG. 2, the light focusing unit 300 may include, for example, a liquid crystal lens that may control the light focus using an applied voltage. The light focusing unit 300 may be segmented into a plurality of unit cells 300a. Each of the unit cells 300a may correspond to a sub-pixel unit 100a of the liquid crystal panel 100. For example, each of the unit cells 300a may correspond to one of an R, G and B sub-pixel unit of the unit pixel unit 100b of the liquid crystal panel 100. Thus, the brightness of each pixel unit 100b or of each sub-pixel unit 100a including the R, G, and B sub-pixel units may be individually controlled.

Figure 3A:
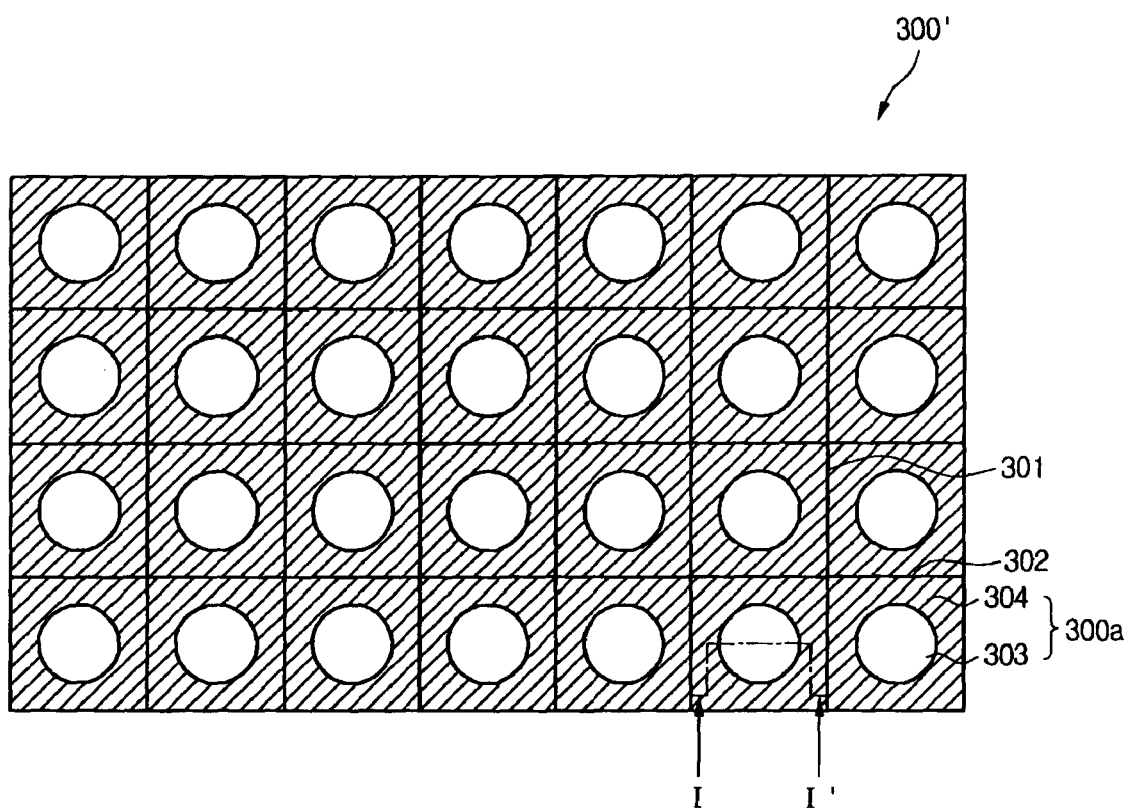
FIG. 3A is a plan view of an exemplary liquid crystal lens for light focusing according to an embodiment of the present invention.
Figure 3B:
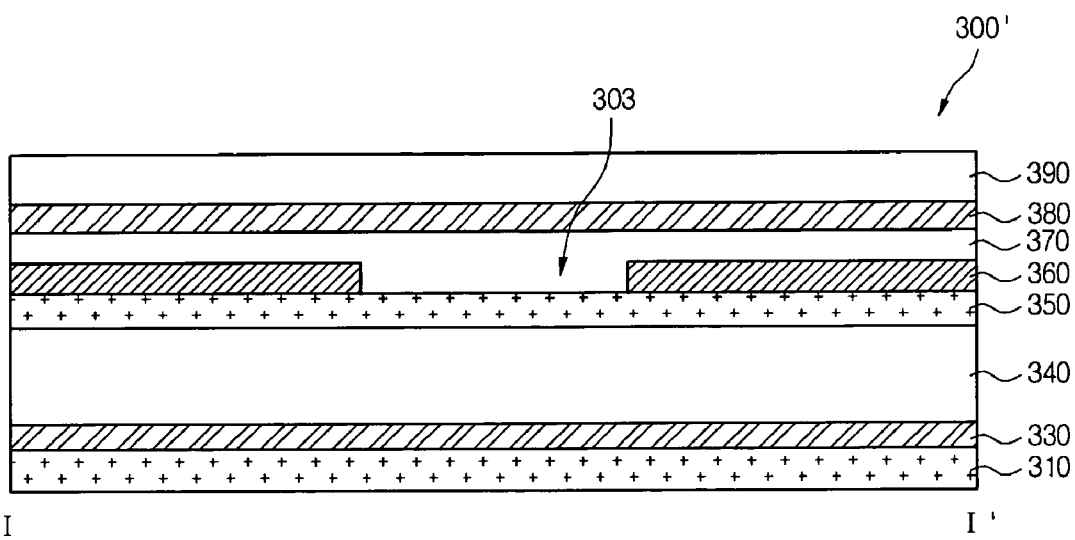
FIG. 3B is a cross-sectional view of the exemplary liquid crystal lens taken along line I-I' of FIG. 3A.

FIG. 3A is a plan view of an exemplary liquid crystal lens for light focusing according to an embodiment of the present invention. FIG. 3B is a cross-sectional view of the exemplary liquid crystal lens taken along line I-I' of FIG. 3A. Referring to FIGS. 3A and 3B, the liquid crystal lens 300' is defined by a plurality of cells 300a, and includes a first substrate 390 and a second substrate 310, which are spaced apart from each other by a predetermined distance. Moreover, a liquid crystal layer 340 is interposed between the first and second substrates 390 and 310.

A plurality of gate lines 301 and data lines 302 cross each other on the second substrate 310. A thin film transistor (not shown) is located at each crossing of one of the gate lines 301 with one of the data lines 302. Additionally, each crossing of one of the gate lines 301 with one of the data lines 302 defines a unit cell 300a. The area of the unit cell 300a may be substantially equal to the size of a sub-pixel unit 100a (shown in FIG. 2), or the size of a pixel unit 100b including R, G and B sub-pixel units (shown in FIG. 2). Therefore, brightness may be individually controlled in each sub-pixel unit 100a of the liquid crystal panel 100, or in each pixel unit 100b. Additionally, the unit cell 300a includes a first region 303 and a second region 304 surrounding the first region 303. The first region 303 may be of any shape. The shape of the first region 303 may be chosen to effectively focus the light into a predetermined portion in the liquid crystal panel 100. For example, the first region 303 may be of a circular shape.

Referring to FIG. 3B, a first electrode 330 is disposed on the second substrate 310 to be electrically connected to the thin film transistor. The first electrode 330 may be formed of a transparent conductive material. For example, the first electrode 330 may be formed of indium tin oxide (ITO) or indium zinc oxide (IZO).

A second electrode 380 is disposed on an inner surface of the first substrate 390. The second electrode 380 may be formed of a transparent conductive material. For example, the second electrode 380 may be formed of ITO or IZO. A first transparent substrate 370 is disposed on an inner surface of the second electrode 380. The first transparent substrate 370 may be a glass substrate.

A third electrode 360 is formed on an inner surface of the first transparent substrate 370 with an opening exposing a first region 303 of the first transparent substrate 370, and corresponding portions of the first electrode 330 and the second electrode 380. The third electrode 360 may be formed of one of Al, Pt, Au, Ir, Cr, Mg, Ag, Ni, Ca, Ba, and a compound metal thereof. Thus, the opening is formed in the liquid crystal lens 300', and the liquid crystal lens 300' includes a first region 303 excluding the third electrode 360, and a second region 304 including a portion of the third electrode 360.

A second transparent substrate 350 is disposed below the third electrode 360. The second transparent substrate 350 may be a glass substrate.

A predetermined voltage is applied between the first electrode 330 and the third electrode 360 of the liquid crystal lens 300'. A phase delay of a light transmitted through the unit cell is controlled by controlling a voltage between the first electrode 330 and the second electrode 380. The light transmitted through the unit cell 300a has an effect similar to the light transmitted through a convex lens.

The phase delays of light transmitted through each point of the unit cell vary with the location of the point on the unit cell 300a. For example, the phase delay of the transmitted light may be higher at the center of the unit cell 300a than at a point along the periphery of the unit cell 300a. Thus, by controlling the phase delay, the light transmitted through the unit cell 300a may be focused into a predetermined region, for example the first region 303.

When a voltage applied between the first electrode 330 and the second electrode 380 increases, the difference in phase delay increases from the center to the periphery of the unit cell 300a. Thus, a region where the light transmitted through the liquid crystal lens is focused, i.e., the focal length, becomes larger. That is, a light focusing effect of the liquid crystal lens may be controlled in accordance with the voltage applied between the first electrode 330 and the second electrode 380.

Figure 4:
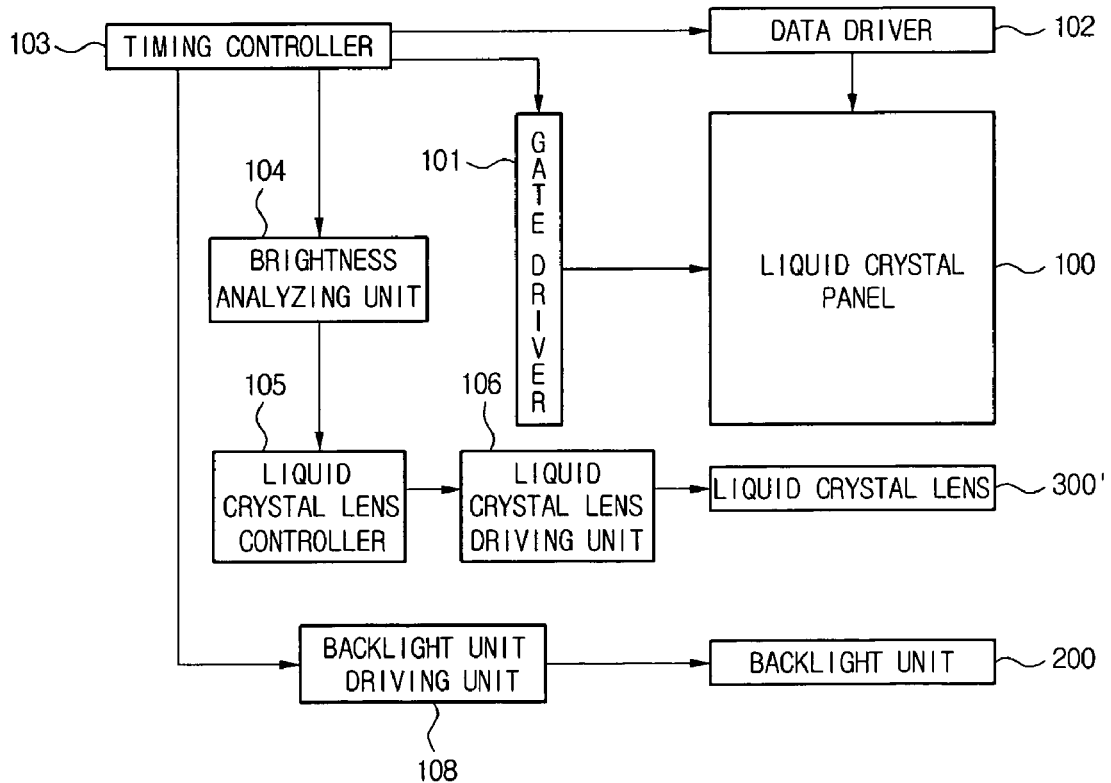
FIG. 4 is a block diagram of an LCD device according to an embodiment of the present invention.

FIG. 4 is a block diagram of an LCD device according to an embodiment of the present invention. Referring to FIG. 4, the LCD device includes a liquid crystal panel 100 for displaying an image, a gate driver 101 and a data driver 102 for driving the liquid crystal panel 100, and a timing controller 103 for controlling the gate driver 101 and the data driver 102. As described above, the liquid crystal panel 100 includes a plurality of gate lines and data lines crossing each other. A thin film transistor (not shown) is provided at each crossing of the gate lines with the data lines. The gate driver 101 sequentially supplies scan signals into the gate lines in response to a gate control signal generated from the timing controller 103. The data driver 102 supplies a data voltage into the data lines in response to a data control signal supplied from the timing controller 103.

The LCD device further includes a backlight unit driving unit 108 generating a backlight unit driving voltage by receiving a backlight control signal supplied from the timing controller 103. A backlight unit 200 projects light onto the liquid crystal panel 100. The backlight unit 200 is driven by a driving voltage supplied from the backlight unit driving unit 108.

The LCD device includes a liquid crystal lens 300' disposed between the liquid crystal panel 100 and the backlight unit 109 to focus light into a predetermined region using a driving voltage of the liquid crystal lens 300'. The LCD device may also include a brightness analyzing unit 104 receiving an image signal from the timing controller 103 to analyze a brightness thereof, a liquid crystal lens controller 105 using a brightness analysis provided from the brightness analyzing unit 104 to output a control signal, and a liquid crystal lens driving unit 106 generating a driving voltage of the liquid crystal lens 300' in response to the control signal.

After analyzing an image signal supplied into the brightness analyzing unit 104, obtaining the brightness information of an image, and determining a brightness signal supplied into each position of the liquid crystal panel 100, the brightness signal is supplied into the liquid crystal lens controller 105. The liquid crystal lens controller 105 generates a control signal in response to the brightness signal. Then, the control signal is supplied into the liquid crystal lens driving unit 106. The liquid crystal lens driving unit 106 generates a driving voltage in accordance with the control signal to drive the liquid crystal lens 300'.

As described above, the liquid crystal lens 300' includes first, second and third electrodes. When a voltage between the first electrode and the third electrode is fixed, the light focusing effect of the liquid crystal lens 300' may be controlled by adjusting a voltage between the first electrode and the second electrode. Thus, by controlling the voltage between the first electrode and the second electrode, the phase delay of the unit cell in the liquid crystal lens 300' may be controlled to focus light passing through the unit cell into a predetermined region of the liquid crystal panel 100. For example, the phase delay occurs in a unit cell of the liquid crystal lens 300' corresponding to a region that requires a high brightness in the liquid crystal panel 100. Thus, the light may be focused into the region requiring a high brightness.

Figure 5:
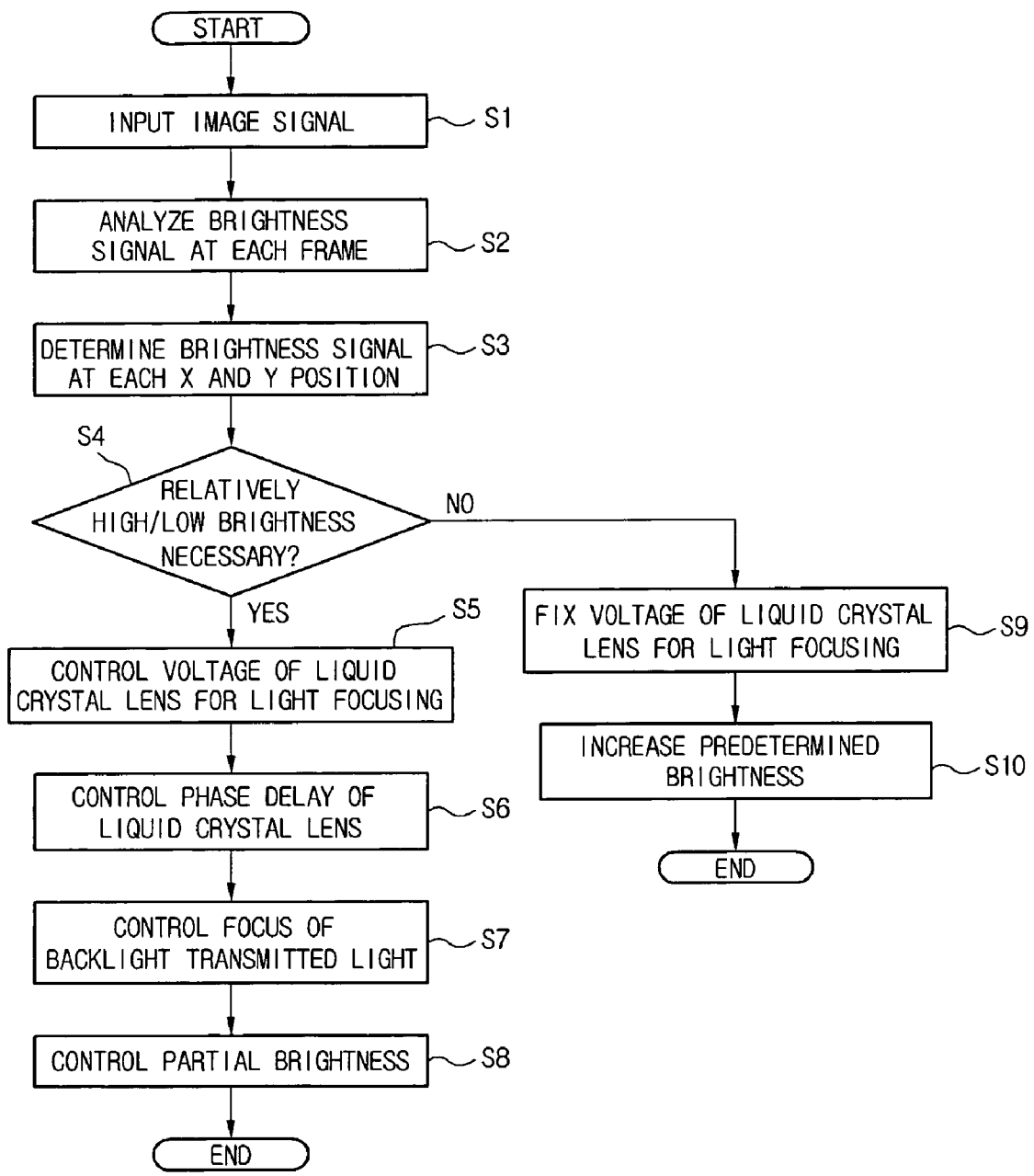
FIG. 5 is a flowchart illustrating a method for driving an LCD device according to an embodiment of the present invention.

FIG. 5 is a flowchart illustrating a method for driving an LCD device according to an embodiment of the present invention. Referring to FIGS. 4 and 5, an image signal is inputted into the timing controller 103 at step S1. The image signal may include R, G and B data for one or more frame of images to be displayed.

At step S2, the inputted image signal is sent from the timing controller 103 to the brightness analyzing unit 104. The brightness analyzing unit 104 analyzes the brightness of each of the one or more frame of received images to be displayed on the liquid crystal panel 100.

At step S3, the brightness analyzing unit 104 determines a brightness signal at each X and Y position, for example at each row and column position, of the one or more frame to be displayed on the liquid crystal panel 100. Then, the brightness analyzing unit 104 supplies the determined brightness signal of each X and Y position to the liquid crystal lens controller 105.

At step S4, the liquid crystal lens controller 105 determines the X' and Y' positions requiring relatively high brightness in the one or more frame.

At step S5, when there are such high-brightness X' and Y' positions, the liquid crystal lens controller 105 supplies a control signal to the liquid crystal lens driving unit 106 for controlling a voltage of the liquid crystal lens 300'.

At step S6, the liquid crystal lens driving unit 106 generates a driving voltage in accordance with the control signal to control a phase delay of the liquid crystal lens 300' at the corresponding high-brightness X' and Y' position. Thus, the phase delay of the liquid crystal lens 300' at the unit cell 300a located at the X' and Y' position is controlled by the driving voltage in accordance with the control signal.

At step S7, light is projected from the backlight unit 300 through the liquid crystal lens 300' onto the liquid crystal panel 100. By controlling the phase delay of the unit cell 300a in the liquid crystal lens 300', the light transmitted from the backlight unit 300 through the liquid crystal lens is focused through the unit cell 300a onto the high-brightness region of the liquid crystal panel 100.

Accordingly, at step S8, brightness distribution is controlled by the focusing of the light through the unit cell 300a to achieve the relative partial brightness at the X' and Y' location.

Alternatively, at step S9, when there is no region requiring a higher brightness than other regions of the liquid crystal panel 100, the liquid crystal controller 105 supplies a control signal to the liquid crystal lens driving unit 106 for fixing a driving voltage of the liquid crystal lens 300'. Then, light projected from the backlight unit 300 is focused by the liquid crystal lens 300' onto the liquid crystal panel 300.

At step S10, the light projected from the backlight unit 300 is uniformly delivered onto the liquid crystal panel 100 with a predetermined increased brightness.

In an embodiment of the present invention, the LCD device is driven so that light is focused into a predetermined region requiring a high brightness. Accordingly, the total brightness of the light does not need to be increased to achieve the required high brightness at the predetermined region.

Moreover, in an embodiment of the present invention, the light may be controlled to be projected onto a display region rather than a non-display region of a liquid crystal panel. Accordingly, excellent low-power consumption is achieved and light efficiency increases.

Moreover, in an embodiment of the present invention, a light focusing unit is used in the LCD device to focus light into a predetermined region of the liquid crystal panel in response to an external signal. Accordingly, light efficiency improves and power consumption decreases.

Moreover, in an embodiment of the present invention, the total brightness does not need to be increased to achieve a high brightness in a predetermined region of the liquid crystal panel. Accordingly, a backlight unit of the LCD device may operate using a low power, thus reducing heat generation by the backlight unit and preventing heat-related problems.

Additionally, in an embodiment of the present invention, a partial brightness corresponding to an input image may be controlled. Accordingly, moving picture quality may be improved.

It will be apparent to those skilled in the art that various modifications and variations may be made in the liquid crystal display device and method for driving the same of embodiments of the present invention. Thus, it is intended that embodiments of the present invention cover the modifications and variations of the embodiments described herein provided they come within the scope of the appended claims and their equivalents.

What is claimed is:

1. A liquid crystal display device, comprising:
   a liquid crystal panel;
   a backlight unit supplying light onto the liquid crystal panel; and
   a light focusing unit between the backlight unit and the liquid crystal panel, the light focusing unit for focusing the light supplied from the backlight unit into a first region of the liquid crystal panel by increasing a phase delay of the light supplied from the backlight unit within a portion of the light focusing unit.

2. The liquid crystal display device according to claim 1, wherein the light focusing unit includes a liquid crystal lens.

3. The liquid crystal display device according to claim 1, wherein the light focusing unit comprises:
   first and second electrodes facing each other; and
   a third electrode between the first and second electrodes and having a hole exposing portions of the first and second electrodes, wherein the phase delay of the light supplied from the backlight unit is increased by increasing a voltage between the first and second electrodes.

4. The liquid crystal display device according to claim 3, wherein the first electrode is formed of ITO or IZO.

5. The liquid crystal display device according to claim 3, wherein the second electrode is formed of ITO or IZO.

6. The liquid crystal display device according to claim 3, wherein the third electrode is formed of one selected from the group consisting of Al, Pt, Au, Ir, Cr, Mg, Ag, Ni, Ca, Ba, and a compound metal thereof.

7. The liquid crystal display device according to claim 1, wherein the light focusing unit comprising:
   a first substrate and a second substrate spaced apart from each other by a predetermined distance;
   a liquid crystal layer between the first and the second substrates;
   a first electrode on the second substrate;
   a second electrode below the first substrate;
   a first transparent substrate below the second electrode;
   a third electrode below the first transparent substrate and having a hole exposing a predetermined portion of the first transparent substrate; and
   a second transparent substrate below the third electrode.

8. The liquid crystal display device according to claim 7, further comprising a thin film transistor connected to the first electrode electrically on the second substrate.

9. A liquid crystal display device, comprising:
   a liquid crystal panel for displaying an image;
   a backlight unit projecting light onto the liquid crystal panel;
   a timing controller controlling the backlight unit; and
   a light focusing unit between the backlight unit and the liquid crystal panel, the light focusing unit for focusing the light supplied from the backlight unit into a first region of the liquid crystal panel in accordance with a brightness of an image signal from the timing controller by increasing a phase delay of the light supplied from the backlight unit within a portion of the light focusing unit.

10. The liquid crystal display device according to claim 9, wherein the light focusing unit comprising:
    a brightness analyzing unit analyzing the brightness of the image signal from the timing controller;
    a liquid crystal lens controller controlling a control signal using the brightness analysis from the brightness analyzing unit;
    a liquid crystal lens driving unit generating a driving voltage in response to the control signal; and
    a liquid crystal lens focusing light according to the driving voltage generated by the liquid crystal lens driving unit.

11. The liquid crystal display device according to claim 10, wherein the brightness analyzing unit determines the brightness signal supplied at each position of the liquid crystal panel.

12. The liquid crystal display device according to claim 10, wherein the brightness analyzing unit analyzes the image signal to determine the brightness of the image signal from the timing controller at each image pixel position on the liquid crystal panel.

13. The liquid crystal display device according to claim 9, wherein the light focusing unit comprises:
    first and second electrodes facing each other; and
    a third electrode between the first and second electrodes and having a hole exposing portions of the first and second electrodes, wherein a predetermined voltage is applied between the phase delay of the light supplied from the backlight unit is increased by increasing a voltage between the first and second electrodes.

14. The liquid crystal display device according to claim 13, wherein a voltage between the first electrode and the third electrode is fixed, and the phase delay of the light supplied from the backlight unit is increased by increasing a voltage between the first and second electrodes.

15. The liquid crystal display device according to claim 13, wherein the first electrode is formed of ITO or IZO.

16. The liquid crystal display device according to claim 13, wherein the second electrode is formed of ITO or IZO.

17. The liquid crystal display device according to claim 13, wherein the third electrode is formed of one selected from the group consisting of Al, Pt, Au, Ir, Cr, Mg, Ag, Ni, Ca, Ba, and a compound metal thereof.

18. A method for driving a liquid crystal display device including a liquid crystal panel, a backlight unit supplying light onto the liquid crystal panel, and a light focusing unit disposed between the backlight unit and the liquid crystal panel, the method comprising:
- inputting an image to be displayed on the liquid crystal panel;
- determining a first region in the input image requiring a high brightness; and
- focusing the light supplied from the backlight unit into the first region in accordance with the high brightness required within the first region by increasing a phase delay of the light supplied from the backlight unit through a portion of the light focusing unit.

* * * * *